(12) United States Patent
Mittal et al.

(10) Patent No.: US 9,565,130 B2
(45) Date of Patent: Feb. 7, 2017

(54) CLOUD-BASED RESOURCE AVAILABILITY CALCULATION OF A NETWORK ENVIRONMENT

(71) Applicant: CISCO TECHNOLOGY, INC., San Jose, CA (US)

(72) Inventors: Shailesh Mittal, Santa Clara, CA (US); Raghu Krishnamurthy, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 355 days.

(21) Appl. No.: 14/303,356

(22) Filed: Jun. 12, 2014

(65) Prior Publication Data

US 2015/0365341 A1 Dec. 17, 2015

(51) Int. Cl.
*G06F 15/173* (2006.01)
*H04L 12/911* (2013.01)
*H04L 29/08* (2006.01)
*H04L 12/801* (2013.01)
*G06F 9/455* (2006.01)

(52) U.S. Cl.
CPC ......... *H04L 47/822* (2013.01); *G06F 9/45533* (2013.01); *H04L 47/10* (2013.01); *H04L 47/70* (2013.01); *H04L 67/10* (2013.01)

(58) Field of Classification Search
CPC .............................. H04L 47/822; H04L 47/10
See application file for complete search history.

(56) References Cited

U.S. PATENT DOCUMENTS

| 5,864,563 A | 1/1999 | Ratcliffe |
| 7,660,888 B2 | 2/2010 | Smyth et al. |
| 8,238,256 B2 | 8/2012 | Nugent |

(Continued)

FOREIGN PATENT DOCUMENTS

WO 03/021444 3/2003

OTHER PUBLICATIONS

Bandini, et al., "A Grid-QoS Decision Support System using Service Level Agreements," In Proceedings of Congresso da Sociedade Brasileira de Computacao de 2009, CSBC 09, Sociedade Brasileira de Computacao: Porto Alegre, RS, Brazil, Jul. 24, 2009, 8 pages.

(Continued)

*Primary Examiner* — Brian P Whipple
(74) *Attorney, Agent, or Firm* — Patent Capital Group

(57) ABSTRACT

An example method for cloud-based resource availability calculation of a network environment is provided and includes receiving a plurality of system error log (SEL) data in real time at a virtual appliance executing in a first network. The SEL data is received from a remote second network indicating system events associated with corresponding resources in the second network. The method further includes calculating a resource availability (RA) index indicative of availability of resources for workload deployment in the second network, and sending the RA index to a management application executing in the second network for appropriate management and allocation of resources in the second network. In specific embodiments, the method further includes receiving a SEL inventory associated with a specific resource in the second network, and updating the RA index based on the SEL inventory.

17 Claims, 5 Drawing Sheets

(56) References Cited

U.S. PATENT DOCUMENTS

| | | | |
|---|---|---|---|
| 2005/0242925 A1* | 11/2005 | Zaretsky | G06F 11/0706 340/10.1 |
| 2006/0106938 A1* | 5/2006 | Dini | G06F 11/008 709/228 |
| 2009/0013210 A1* | 1/2009 | McIntosh | H04L 12/2697 714/4.1 |
| 2012/0136970 A1 | 5/2012 | Chen | |
| 2013/0097601 A1 | 4/2013 | Podvratnik et al. | |

OTHER PUBLICATIONS

"Chapter 6, Introduction to System Event Log Messages," Cisco UCS Faults and Error Messages Reference Manual, Cisco Systems, Inc., Aug. 2012, 10 pages; http://www.cisco.com/c/en/us/td/docs/unified_computing/ucs/ts/faults/reference/2-0/UCSFaultsErrorsRef_20.pdf.

"Chapter 8, Baseboard Management Controller Messages," Cisco UCS Faults and Error Messages Reference Manual, Cisco Systems, Inc., Aug. 2012; 18 pages; http://www.cisco.com/c/en/us/td/docs/unified_computing/ucs/ts/faults/reference/2-0/UCSFaultsErrorsRef_20.pdf.

"Cisco UCS Central Software (2013)," Cisco Data Sheet, Cisco Systems, Inc., Jul. 2013, 8 pages.

\* cited by examiner

CLOUD-BASED RESOURCE AVAILABILITY CALCULATION OF A NETWORK ENVIRONMENT

TECHNICAL FIELD

This disclosure relates in general to the field of communications and, more particularly, to cloud-based resource availability calculation of a network environment.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for cloud-based resource availability calculation of a network environment is provided and includes receiving a plurality of system error log (SEL) data in real time at a virtual appliance executing in a first network. The SEL data is received from a remote second network indicating system events associated with corresponding resources in the second network. The method further includes calculating a resource availability (RA) index indicative of availability of resources for workload deployment in the second network, and sending the RA index to a management application executing in the second network for appropriate management and allocation of resources in the second network. In specific embodiments, the method further includes receiving a SEL inventory associated with a specific resource in the second network, and updating the RA index based on the SEL inventory.

As used herein, the term "SEL data" refers to a log (e.g., record, note) of a single significant system event associated with a particular resource (e.g., network or compute resource, such as a memory element, processor, etc.) in a network. SEL data can be formatted as at least one file that records the system event according to any suitable format. SEL data can also include information about location of events (e.g., dynamic random access memory (DRAM) errors are reported on location, central processing unit (CPU) cache miss is reported with CPU core location, etc.). Examples of significant system events indicated by the SEL data include software events (e.g., loss of data, reboot operations, successful launch of a program, driver, or service, etc.); security-related events (e.g., user login, malware interaction, etc.); setup events (e.g., events detected by domain controllers); and hardware events (e.g., events logged by the operating system of the reporting endpoint and related to the hardware of the system, such as boot-up, shutdown, memory failure, bug-check, driver error, etc.).

Example Embodiments

Figure 1:
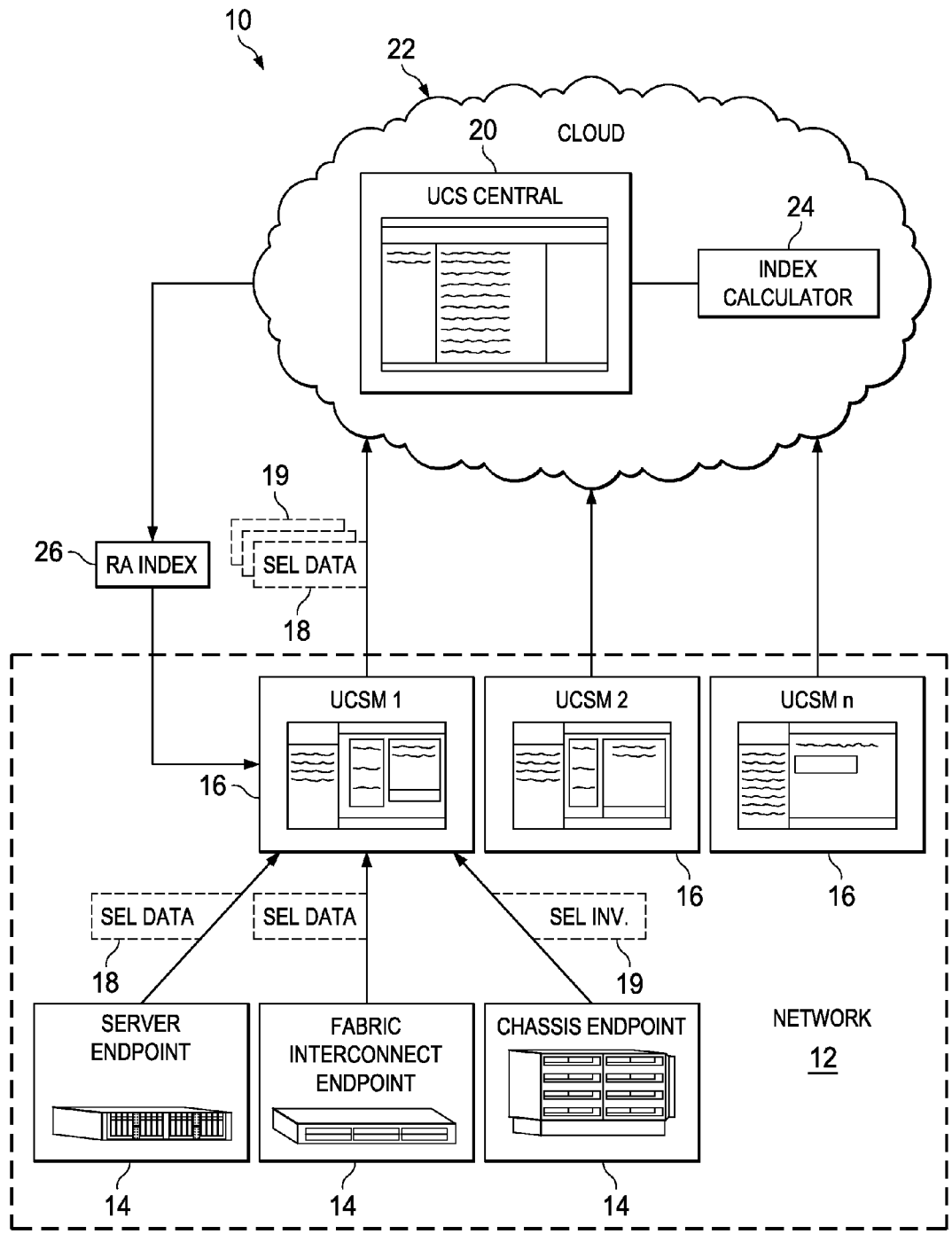
FIG. 1 is a simplified block diagram illustrating a communication system for cloud-based resource availability calculation of a network environment.

Turning to FIG. 1, FIG. 1 is a simplified block diagram illustrating a communication system 10 for cloud-based resource availability calculation of a network environment in accordance with one example embodiment. FIG. 1 illustrates a communication system 10 comprising a network 12 that includes a plurality of endpoints 14 managed by one or more instances of a management application referred to herein as unified computing system manager (UCSM) 16. Each endpoint 14 may generate SEL data 18 and/or SEL inventory 19, which is sent to the respective managing instance of UCSM 16. In some embodiments, baseboard management controllers (BMCs) associated with each endpoint 14 may write system events into one or more log files (e.g., in flash memory of an associated network element) for example, whenever the event(s) occur, and the log file(s) may be included in SEL data 18 and/or SEL inventory 19.

UCSM 16 may relay (e.g., forward, convey, send, deliver, etc.) SEL data 18 and SEL inventory 19 to at least one instance of a virtual appliance referred to herein as unified computing system (UCS) Central 20 executing in a cloud 22. UCS Central 20 may include an index calculator 24 that processes SEL data 18 and SEL inventory 19 to generate a resource availability (RA) index 26 that is sent to UCSM 16. UCSM 16 may use RA index 26 in management resource allocation decisions for resources in network 12.

As used herein, the term "RA index" refers to a numeric value that indicates availability of one or more resources in network 12. In a general sense, the RA index may be calculated for individual components (e.g., central processor units (CPUs), dynamic random access memory (DRAM), etc.) by analyzing SEL data generated by baseboard management controllers (BMCs) of network elements and/or reading appropriate sensor records. A "resource" comprises a component that can be used for workload deployment and software execution; examples of resources include processors, memory elements, network interfaces, network links, sensors, etc. In a general sense, resources can include computation resources (e.g., a component that performs execution of a process); service providing resources (e.g., application components that invoke computation tasks); network resources (e.g., components that provide bandwidth for communication); and data storage resources (e.g., components that provide storage for data). According to various embodiments, RA index 26 may be calculated by index calculator according to any known method.

The term "network element" is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

As used herein, the term "SEL inventory" includes a log of multiple significant system events associated with a particular resource in network 12 (e.g., associated with a specific endpoint 14). For example, SEL inventory 19 may be generated by collecting substantially all SEL data 18 during a certain time interval (e.g., from boot-up until a specific query for SEL inventory 19 is received) for a specific endpoint 14.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Workloads are deployed on physical servers to ensure compliance with service level agreements (SLAs) between network operators and network subscribers. In a general sense, the term "workload" refers to the amount of processing to be executed by a computing resource in a given time interval; the workload can include application programming running in the computing resource and a certain number of users connected to and interacting with the applications. Network administrators may select target servers for workload deployment based on server resource capacities (e.g., CPU, memory and input/output capabilities). Over time, the network and computing resources can be degraded, for example, due to hardware component failures such as CPU core de-allocation, DRAM failures, etc. Additionally, total resource capacity may be lowered when certain network and computing resources enter a lower power state. Such degraded resource capacity may affect resource allocation, for example, when a server running with degraded components/capacity, may not be able to host workloads according to the SLAs.

In such scenarios, the RA index can inform network administrators about the true (e.g., effective) capacity of servers and other network and computing resources in the network, before such resources are selected for deploying workloads according to the SLAs. In a typical domain (e.g., with multiple servers), the resource availability data obtained from individual network and computing resources can be overwhelming and can take a lot of processing power to analyze and correlate to compute the RA index. Management applications, such as UCSM managing individual domains of the network typically do not have sufficient storage capacity or computing power to store and analyze resource availability information on a regular basis.

Management domains may easily get stressed or blocked with processing the large volume of data from individual network and compute resources to calculate the resource availability index of the underlying hardware. Thus regular management activities may get delayed and/or timed-out significantly. Additionally, if domain level management solutions are run in an embedded environment, stringent restrictions on the compute and network resources may have to be applied to analyze such voluminous information. Extrapolating the stringent requirement to multiple management domains in the date center could make the situation even worse.

Communication system 10 is configured to address these issues (among others) to offer a system and method for cloud-based resource availability calculation of a network environment. According to various embodiments, UCS Central 20 may receive a plurality of SEL data 18 from network 12 in real time indicating system events associated with corresponding resources (e.g., processors and memory elements in endpoints 14) in network 12. UCS Central 20 may calculate RA index 26 indicative of availability of resources for workload deployment in network 12 and send RA index 26 to UCSM 16 executing in network 12 for appropriate management and allocation of resources.

Note that network 12 may comprise a plurality of domains, each domain being managed by a separate instance of UCSM 16. In many embodiments, each domain (e.g., referred to as a unified computing system) may be managed by an instance of UCSM 16 embedded in a fabric interconnect at an individual domain level; substantially all domains may be managed by UCS Central 20 at a network level. Massive sensor records and activity events (e.g., error events from BMCs) can require a significant chunk of resources to process at a domain level by individual instances of UCSM 16. Instead of using UCSM 16 instances for processing voluminous sensor and activity/error records, SEL data 18 may be processed by a remote central management application, UCS Central 20, executing as a virtual appliance in a server in cloud 22.

Each UCSM 16 instance may forward SEL data 18 to UCS Central 20 in cloud 22; each UCSM 16 instance may receive SEL data 18 (e.g., from its managed endpoints 14) to forward from resources in its respective managed domain. Each UCSM 16 instance registers with UCS Central 20 in some embodiments. In some embodiments, UCS Central 20 may receive SEL inventory 19 associated with a specific resource (e.g., in a particular endpoint 14) in network 12. The instance of UCSM 16 managing the specific resource may have previously sent a query requesting SEL inventory 19, and may have received SEL inventory 19 in response. UCS Central 20 may update RA index 26 based on SEL inventory 19.

Computing RA index 26 can include performing statistical analysis of SEL data 18 (and SEL inventory 19), and correlating and consolidating SEL data 18 in real time. In many embodiments, RA index 26 may consolidate resource availability at a plurality of levels in network 12. For example, the plurality of levels can include at least a network level, a domain level, a chassis level, a blade level and a device level. After data is processed and RA indices are calculated per domain and sub-components, the RA indices can be passed down to individual domains appropriately.

In some embodiments, SEL data 18 and SEL inventory 19 may be inventoried at UCS Central 20 executing in cloud 22; UCS Central 20 may use throttling process (e.g., to con-server power) to derive RA index 26 for managed endpoints 14. In some embodiments, RA index 26 may be broken down to the device level (e.g., at level of individual hardware devices at endpoints 14) and sent to endpoints 14 by respective UCSM 16 instances.

During operation, each UCSM 16 instance may register with UCS Central 20 (e.g., executing in a virtual machine (VM) in cloud 22). After a substantially complete inventory of all resources in network 12 is received at UCS Central 20, UCS Central 20 may process the information and understand the allocation of resources associated with each managed domain. Each UCSM 16 instance may send incremental SEL data 18 (e.g., as and when an event is detected), which can include component information about degraded components or hardware disablement, such as CPU core de-allocation, dual in-line memory module (DIMM) blacklisting, DRAM failures etc., to UCS Central 20. At UCS central 20, information in SEL data 18 may be processed and RA index 26 may be calculated taking into account individual locations of events indicated in SEL data 18. A resource manager module and a statistics manager module in UCS central 20 may process SEL data 18 to calculate effective capacity of individual devices (e.g., processor, memory element, etc.). The effective capacity information may be consolidated at various levels (e.g., device level, chassis level, blade level, domain level, etc.) including at a network (e.g., data center) level. The consolidated effective capacity information may be included in RA index 26. RA index 26, including effective capacity information at various network levels, may be relayed back to UCSM 16. RA index 26 may be queried at each instance of UCSM 16 as appropriate. For example, administrators can decide to deploy their workloads based on RA index 26 observed at UCSM 16.

Embodiments of communication system 10 can facilitate a faster, more efficient and effective method to enable administrators plan their workload deployments, for example, by accessing information about effective server capacity and not consuming end-point resources to calculate RA index 26. Instead, calculation of RA index 26 may be delegated to cloud 22 for all the managed domains and endpoints 14. Such an approach can facilitate better user experience, effective workload deployment and compliance with SLA requirements.

Turning to the infrastructure of communication system 10, the network topology can include any number of servers, hardware accelerators, virtual machines, switches (including distributed virtual switches), routers, and other nodes interconnected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, UCSM 16 includes a management application located in network 12 that operates to manage, allocate, provision, and operate on endpoints 14 in network 12. For example, UCSM 16 provides a unified, embedded management of substantially all software and hardware components in network 12. UCSM 16 can provide a single point of management for an entire computing system (e.g., a set of network and compute resources linked together to appear as a single computing system) that can span a domain (e.g., portion) of network 12. For example, each instance of UCSM 16 may manage a domain of up to 160 servers and associated infrastructure. In many embodiments, UCSM 16 may use a policy-based approach to provision servers by applying a desired configuration to physical infrastructure. For example, using certain specifically configured service profiles, administrators can reproduce existing physical environments, including I/O configuration, firmware, and settings. The configuration can be applied quickly, accurately, and automatically, improving business agility. A role-based access control (RBAC) model helps ensure security of the system configurations.

According to various embodiments, UCS Central 20 facilitates managing multiple domains of network 12 through a single interface in cloud 22. For example, UCS Central 20 can facilitate global policy compliance, with subject-matter experts choosing appropriate resource pools and policies that may be enforced globally or managed locally. With simple user interface operations (e.g., drag-and-drop), service profiles can be moved between geographies to enable fast deployment of infrastructure, when and where it is needed, for example, to support workloads.

In many embodiments, UCS Central 20 comprises a virtual appliance (e.g., prepackaged as a VMware.ova or an ISO image) hosted outside network 12. As used herein, the term "virtual appliance" comprises a pre-configured virtual machine image ready to execute on a suitable hypervisor; installing a software appliance (e.g., applications with operating system included) on a virtual machine and packaging the installation into an image creates the virtual appliance. The virtual appliance is not a complete virtual machine platform, but rather a software image containing a software stack designed to run on a virtual machine platform (e.g., a suitable hypervisor).

Network 12 comprises one or more domains, each domain managed by a separate and distinct instance of UCSM 16. UCS Central 20 may securely communicate with UCSM 16 instances to (among other functions) collect inventory and fault data from throughout network 12; create resource pools of servers available to be deployed; enable role-based management of resources; support creation of global policies, service profiles, and templates; enable downloading of and selective or global application of firmware updates; and invoke specific instances of UCSM 16 to more detailed management.

In many embodiments, UCS Central 20 stores global resource information and policies accessible through an Extensible Markup Language (XML) application programming interface (API). In some embodiments, operation statistics may be stored in an Oracle or PostgreSQL database. UCS Central 20 can be accessed through an appropriate graphical user interface (GUI), command line interface (CLI), or XML API (e.g., for ease of integration with high-level management and orchestration tools).

Figure 2:
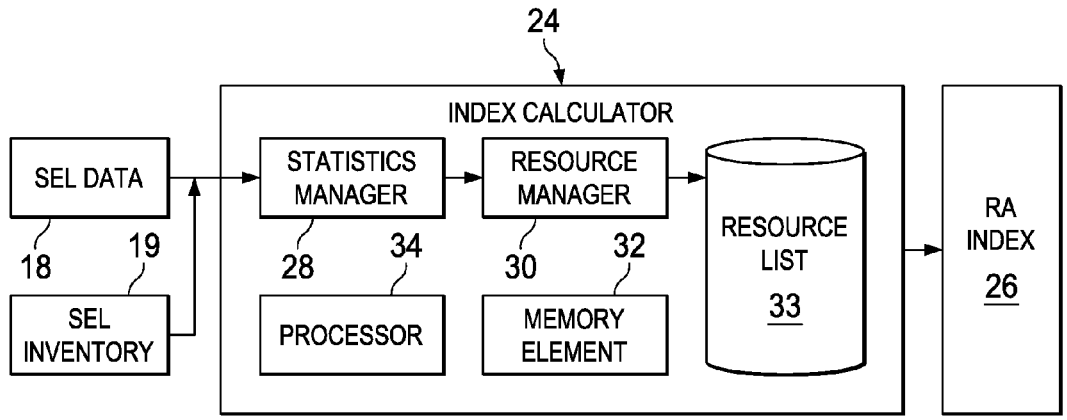
FIG. 2 is a simplified block diagram illustrating example details of embodiments of the communication system.

Turning to FIG. 2, FIG. 2 is a simplified block diagram illustrating example details of another embodiment of communication system 10. In a particular embodiment of a communication system 10, index calculator 24 in UCS Central 20 may include a statistics manager 28 and a resource manager 30 in addition to a memory element 32 and a processor 34. SEL data 18 and SEL inventory 19 from network 12 may be received at index calculator 24. Statistics manager 28 may aggregate and analyze SEL data 18 and SEL inventory 19 using suitable statistical tools and processes. Resource manager 30 may include a database comprising a resource list 33 of substantially all resources and corresponding locations (e.g., domain, UCSM 16 connectivity, etc.) in network 12. Resource manager 30 may compute RA index 26 comprising effective capacity of resources at various levels (e.g., device, blade, chassis, domain, and network) in network 12. Index calculator 24 may use memory element 32 and a processor 34 to perform various operations described herein.

Figure 3:
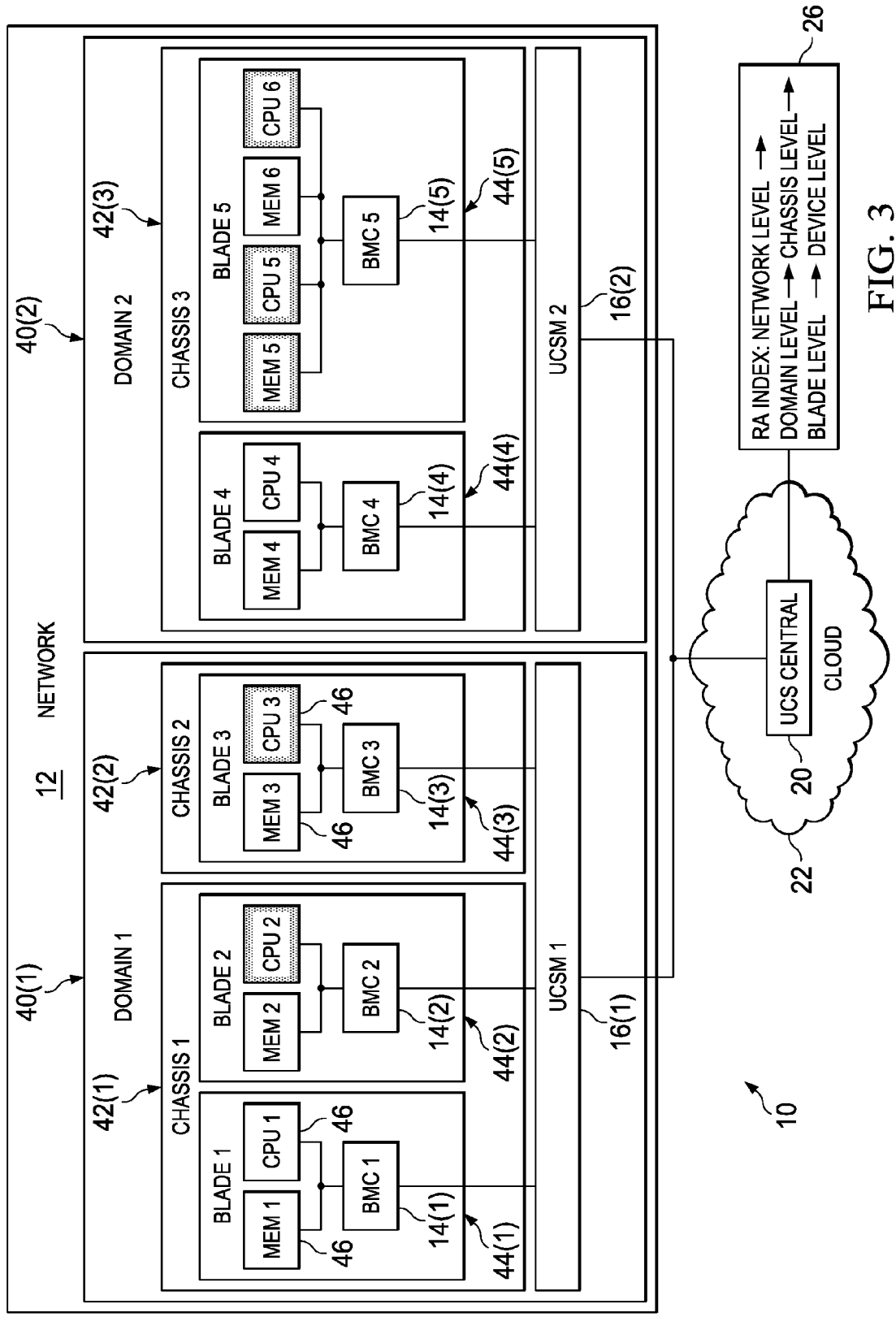
FIG. 3 is a simplified block diagram illustrating other example details of embodiments of the communication system.

Turning to FIG. 3, FIG. 3 is a simplified block diagram illustrating example details of an embodiment of communication system 10. Network 12 may include various domains, for example, domains 40(1) and 40(2). Each domain 40(1) and 40(2) may be managed by a separate instance of UCSM, for example, UCSM 16(1) and 16(2), respectively. Each domain 40(1) and 40(2) may include various chassis; for example, domain 40(1) may include chassis 42(1) and 42(2); domain 40(2) may include chassis 42(3). Each chassis 42(1)-42(3) may include one or more blades. For example, chassis 42(1) includes blades 44(2) and 44(2); chassis 42(2) may include blade 44(3); chassis 42(3) may include blades 44(4) and 44(5).

Each blade may include at least one BMC that represents endpoint 14; for example, blade 44(1) may include BMC 14(1); blade 44(2) may include BMC 14(2); blade 44(3) may include BMC 14(3); blade 44(4) may include BMC 14(4); and blade 44(5) may include BMC 14(5). Each BMC 14(1)-14(5) may manage several devices 46 such as memory elements and processors. For example, BMC 14(1) may manage and record events associated with MEM 1 (e.g., memory element) and CPU 1 (e.g., processor) in blade 44(1); BMC 14(2) may manage and record events associated with MEM 2 and CPU 2 in blade 44(2); BMC 14(3) may manage and record events associated with MEM 3 and CPU 3 in blade 44(3); BMC 14(4) may manage and record events associated with MEM 4 and CPU 4 in blade 14(4); and BMC 14(5) may manage and record events associated with MEM 5, MEM 6, CPU 5, and CPU 6 in blade 44(5). Although only a limited number of devices, blades, chassis and domains are illustrated in the figure, any number of devices, blades, chassis and domains may be included in communication system 10 within the broad scope of the embodiments.

Assume, merely for example purposes and not as a limitation that CPU 2 becomes less effective than its expected processing capacity due to thermal trip errors. BMC 14(2) may log the event into SEL data 18, and send SEL data 18 to UCSM 16(1). Similarly, assume that CPU 3 experiences a significant system event such as a power failure. BMC 14(3) may log the event into SEL data 18, and send SEL data 18 to UCSM 16(1). UCSM 16(1) may relay SEL data 18 from BMC 14(1) and 14(2) to UCS Central 20 in cloud 22. Assume, merely for example purposes that MEM 5, CPU 5 and CPU 6 suffer a breakdown. BMC 14(5) may generate SEL data 18 and send it to UCSM 16(2), which may relay the information to UCS Central 20.

UCS Central 20 may compute RA index 26 at various levels. For example, at a network level, resource availability may be less effective by approximately 40% (e.g., 5 out of 12 devices are not fully effective). At a domain level, domain 40(1) may be less effective by approximately 30% (e.g., 2 out of 6 devices not fully effective) whereas domain 40(2) may be less effective by approximately 50% (e.g., 3 out of 6 devices not fully effective). At a chassis level, chassis 42(1) may be less effective by approximately 25%, whereas chassis 42(2) may be completely out of commission. Various such calculations may be performed based on the type of system event logged in SEL data 18 and RA index 26 calculated appropriately at various levels.

Figure 4:
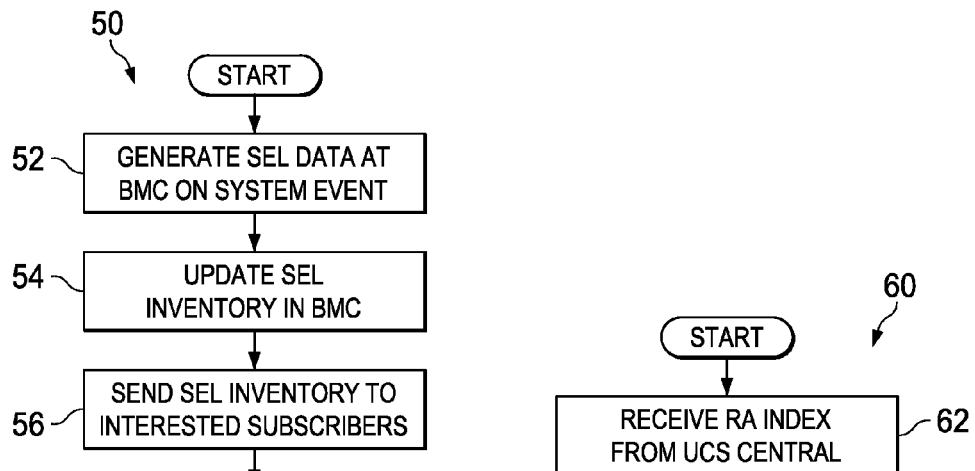
FIG. 4 is a simplified flow diagram illustrating example operations that may be associated with an embodiment of the communication system.

Turning to FIG. 4, FIG. 4 is a simplified flow diagram illustrating example operations 50 that may be associated with embodiments of communication system 10. At 52, each endpoint 14 may generate SEL data 18 at respective BMCs on occurrence of a system event. At 54, each BMC may update its respective SEL inventory 19. At 56, each BMC may send updated SEL inventory 19 to interested subscribers, for example, corresponding UCSM 16 instances.

Figure 5:
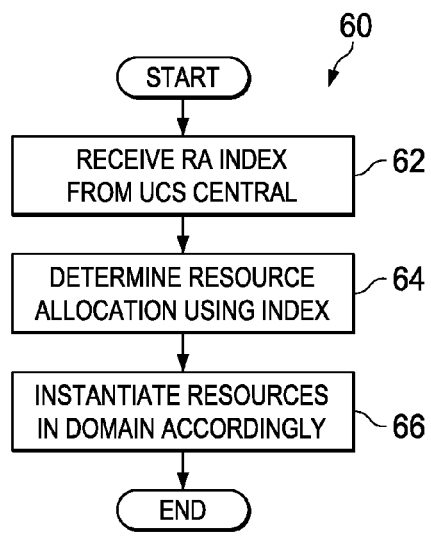
FIG. 5 is a simplified flow diagram illustrating other example operations that may be associated with an embodiment of the communication system.

Turning to FIG. 5, FIG. 5 is a simplified flow diagram illustrating example operations 60 that may be associated with embodiments of communication system 10. At 62, UCSM 16 may receive RA index 26 from UCS Central 20. At 64, UCSM 16 may determine resource allocation in its managed domain using RA index 26. At 66, UCSM 16 may instantiate resources in its managed domain accordingly.

Figure 6:
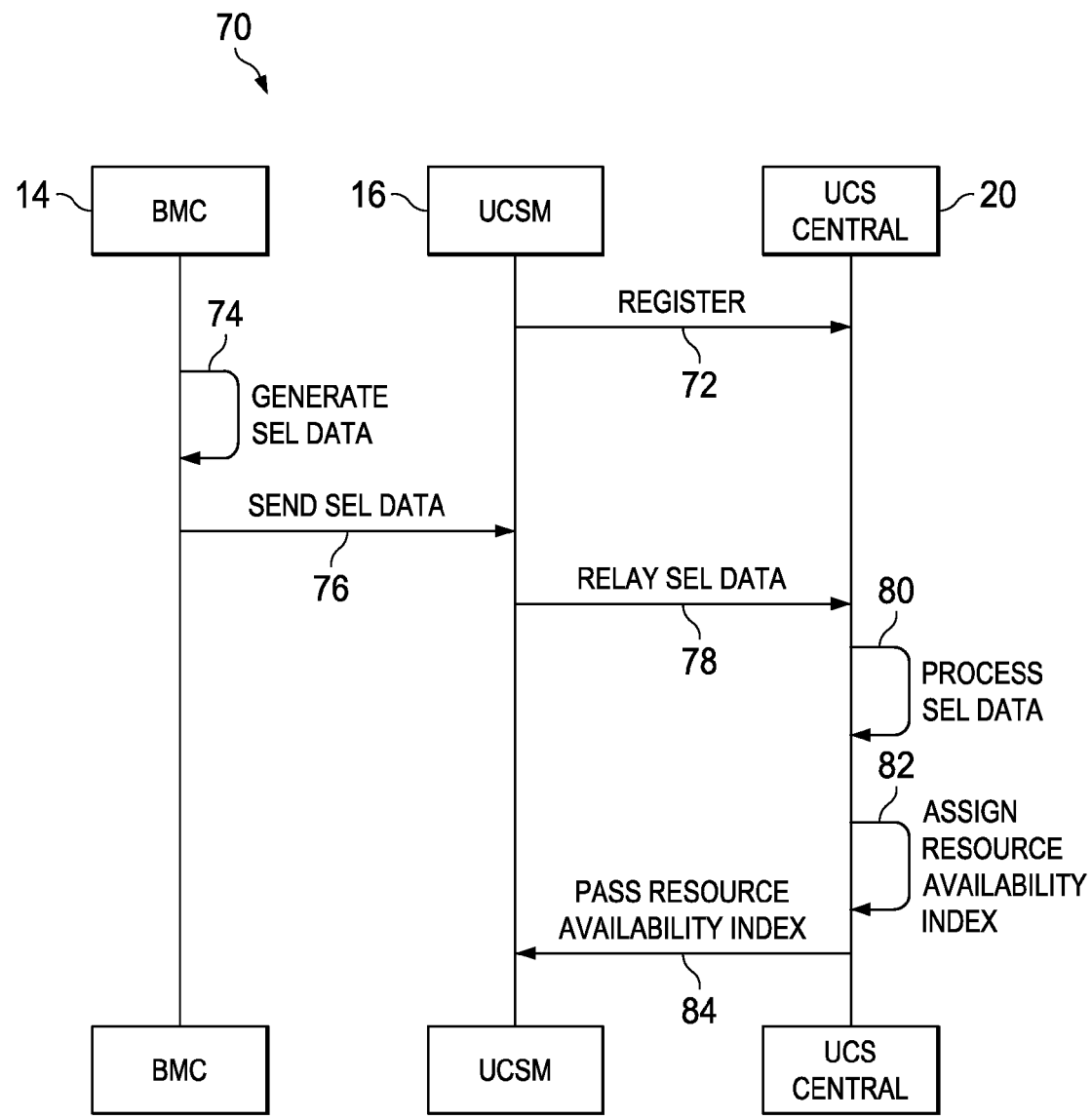
FIG. 6 is a simplified sequence diagram illustrating yet other example operations that may be associated with an embodiment of the communication system.

Turning to FIG. 6, FIG. 6 is a simplified sequence diagram illustrating example operations 70 that may be associated with embodiments of communication system 10. At 72, UCSM 16 may register with UCS Central 20. At 74, endpoint 14, represented by its BMC may generate SEL data 18. At 76, endpoint 14 may send SEL data 18 to UCSM 16. At 78, UCSM 16 may relay SEL data 18 to UCS Central 20. At 80, UCS Central 20 may process SEL data 18. At 82, UCS Central 20 may assign RA index 26 to various levels of network 12 of which UCSM 16 and endpoint 14 (represented by its BMC) comprise a part. At 84, UCS Central 20 may pass RA index 26 to UCSM 16.

Figure 7:
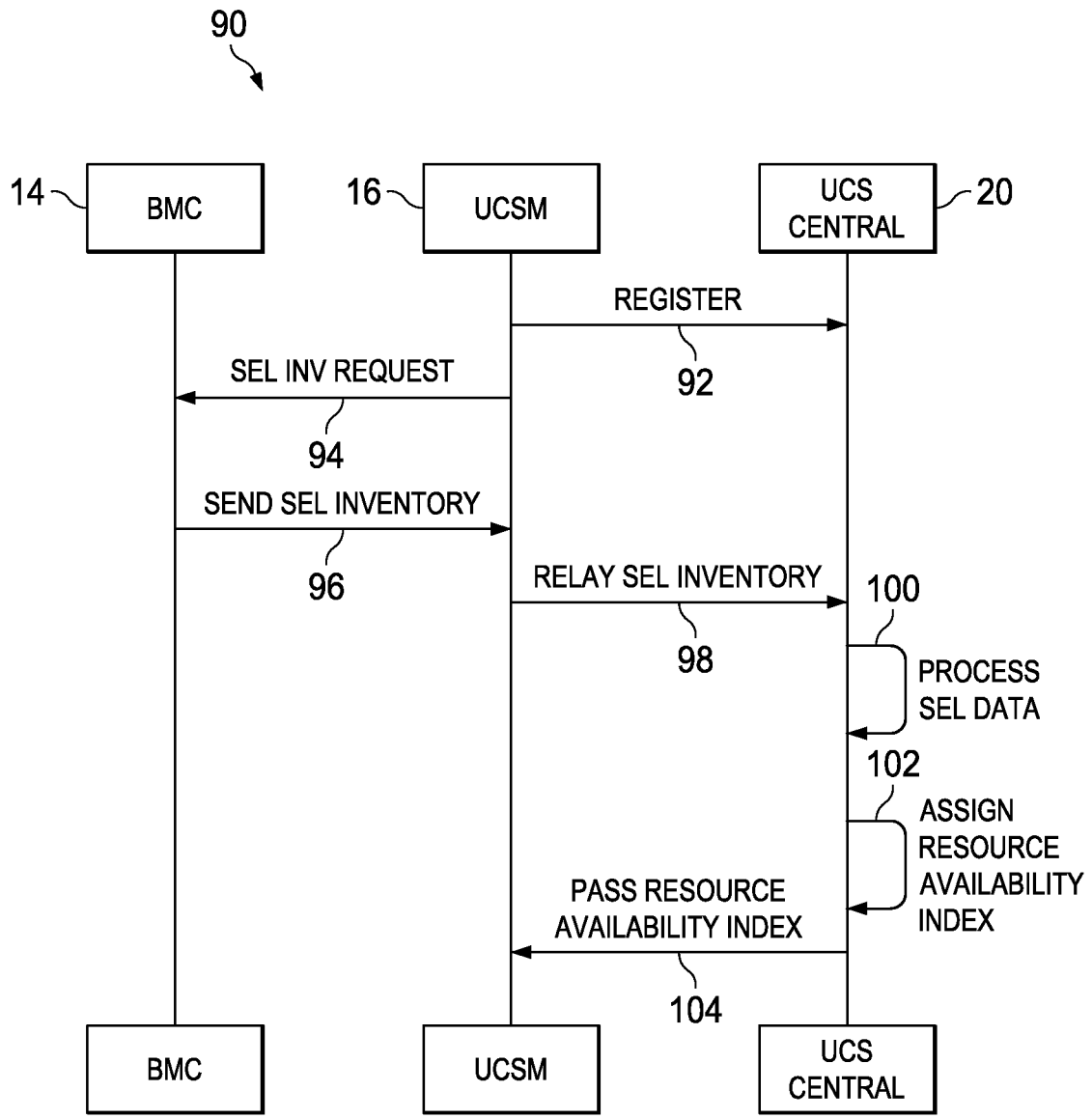
FIG. 7 is a simplified sequence diagram illustrating yet other example operations that may be associated with an embodiment of the communication system.

Turning to FIG. 7, FIG. 7 is a simplified sequence diagram illustrating example operations 90 that may be associated with embodiments of communication system 10. At 92, UCSM 16 may register with UCS Central 20. At 94, UCSM 16 may request endpoint 14 represented by its BMC, for SEL inventory 19. At 96, endpoint 14 may send SEL inventory 19 to UCSM 16. At 98, UCSM 16 may relay SEL inventory 19 to UCS Central 20. At 100, UCS Central 20 may process SEL data included in SEL inventory 19. At 102, UCS Central 20 may update and assign RA index 26 to various levels of network 12 of which UCSM 16 and endpoint 14 (represented by its BMC) comprise a part. At 104, UCS Central 20 may pass RA index 26 to UCSM 16.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, UCS Central 20. In some embodiments, one or more of these features may be implemented in hardware, provided external to these elements, or consolidated in any appropriate manner to achieve the intended functionality. The various network elements (e.g., UCS Central 20) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, UCS Central 20 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 32) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 34) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executing in a virtual appliance in a first network, wherein the method comprises:
   receiving a plurality of system error log (SEL) data in real time from a remote second network indicating system events associated with corresponding resources in the second network;
   calculating a resource availability (RA) index indicative of availability of resources for workload deployment in the second network;
   sending the RA index to a management application executing in the second network for appropriate management and allocation of resources in the second network;
   receiving a SEL inventory associated with a specific resource in the second network, wherein the management application queries the specific resource for the SEL inventory and forwards the SEL inventory from the specific resource to the virtual appliance; and
   updating the RA index based on the SEL inventory.

2. The method of claim 1, wherein the second network comprises a plurality of domains, wherein each domain is managed by a separate instance of the management application.

3. The method of claim 2, wherein each management application instance in the second network forwards SEL data to the virtual appliance in the first network, wherein each management application instance receives the SEL data to forward from resources in its respective managed domain.

4. The method of claim 2, wherein each management application instance registers with the virtual appliance in the first network.

5. The method of claim 1, wherein the RA index consolidates resource availability at a plurality of levels in the second network.

6. The method of claim 5, wherein the plurality of levels comprises at least a network level, a domain level, a chassis level, a blade level and a device level.

7. The method of claim 1, further comprising performing statistical analysis of the SEL data.

8. The method of claim 1, further comprising correlating and consolidating SEL data in real time.

9. The method of claim 1, wherein the SEL data is generated at a baseboard management controller (BMC) associated with each resource in the second network.

10. Non-transitory tangible media that includes instructions for execution, which when executed by a processor associated with a virtual appliance in a first network, is operable to perform operations comprising:
    receiving a plurality of SEL data in real time from a remote second network indicating system events associated with corresponding resources in the second network;
    calculating a RA index indicative of availability of resources for workload deployment in the second network;
    sending the RA index to a management application executing in the second network for appropriate management and allocation of resources in the second network;
    receiving a SEL inventory associated with a specific resource in the second network, wherein the management application queries the specific resource for the SEL inventory and forwards the SEL inventory from the specific resource to the virtual appliance; and
    updating the RA index based on the SEL inventory.

11. The media of claim 10, wherein the RA index consolidates resource availability at a plurality of levels in the second network.

12. The media of claim 11, wherein the plurality of levels comprises at least a network level, a domain level, a chassis level, a blade level and a device level.

13. The media of claim 10, the SEL data is generated at a BMC associated with each resource in the second network.

14. An apparatus in a first network, comprising:
    a virtual appliance;
    a memory element for storing data; and
    a processor, wherein the processor executes instructions associated with the data, wherein the processor and the memory element cooperate, such that the apparatus is configured for:
       receiving a plurality of SEL data in real time from a remote second network indicating system events associated with corresponding resources in the second network;
       calculating a RA index indicative of availability of resources for workload deployment in the second network;
       sending the RA index to a management application executing in the second network for appropriate management and allocation of resources in the second network;
       receiving a SEL inventory associated with a specific resource in the second network, wherein the management application queries the specific resource for the SEL inventory and forwards the SEL inventory from the specific resource to the virtual appliance; and
       updating the RA index based on the SEL inventory.

15. The apparatus of claim 14, wherein the RA index consolidates resource availability at a plurality of levels in the second network.

16. The apparatus of claim 15, wherein the plurality of levels comprises at least a network level, a domain level, a chassis level, a blade level and a device level.

17. The apparatus of claim 14, the SEL data is generated at a BMC associated with each resource in the second network.

* * * * *